United States Patent
Lee et al.

(10) Patent No.: US 11,334,094 B2
(45) Date of Patent: May 17, 2022

(54) METHOD FOR MAINTAINING STABILITY OF MOBILE ROBOT AND MOBILE ROBOT THEREOF

(71) Applicant: LG ELECTRONICS INC., Seoul (KR)

(72) Inventors: Sanghak Lee, Seoul (KR); Nakyeong Kim, Seoul (KR); Sungmin Moon, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 16/557,071

(22) Filed: Aug. 30, 2019

(65) Prior Publication Data

US 2019/0384325 A1 Dec. 19, 2019

(30) Foreign Application Priority Data

Jul. 15, 2019 (KR) .................. 10-2019-0084938

(51) Int. Cl.
  *B25J 19/00* (2006.01)
  *G05D 1/08* (2006.01)
  (Continued)

(52) U.S. Cl.
  CPC ............ *G05D 1/0891* (2013.01); *B25J 5/007* (2013.01); *B25J 9/1633* (2013.01); *B25J 19/002* (2013.01);
  (Continued)

(58) Field of Classification Search
  CPC ....... B25J 5/007; B25J 19/002; B62D 57/024; B60G 2800/0192; G05D 1/021–0297; G05D 2201/0203; G05D 2201/0215; G05D 2201/0216; G05D 2201/0207; G05D 2201/0211; G05D 2201/0208; G05D 2201/0206; G05D 2201/0213;
  (Continued)

(56) References Cited

U.S. PATENT DOCUMENTS

| 7,216,024 B1 * | 5/2007 | Abels ..................... B60T 8/241 340/685 |
| 2015/0003948 A1 * | 1/2015 | Roden ...................... E02F 9/18 414/719 |

(Continued)

*Primary Examiner* — Dale Moyer
(74) *Attorney, Agent, or Firm* — Birch, Stewart, Kolasch & Birch, LLP

(57) ABSTRACT

Disclosed is a mobile robot having a receiving unit and capable of moving, the mobile robot including: at least three wheels arranged at a lower portion of the mobile robot; a sensing unit configured to measure a weight of the mobile robot applied to each of the at least three wheels; a linear actuator connected to the receiving unit and configured to apply a linear motion to the receiving unit in a direction toward a front section or a rearward section of the mobile robot; and a processor configured to, based on the weight applied to each of the at least three wheels measured by the sensing unit, control the linear actuator so as to apply the linear motion to the receiving unit. In addition, disclosed are a method for controlling a center of mass of a mobile robot, including a method performed by the aforementioned mobile robot, and a non-volatile computer readable storage medium in which a computer program for implementing the aforementioned method is stored.

18 Claims, 10 Drawing Sheets

(51) Int. Cl.
*B62D 37/04* (2006.01)
*B25J 5/00* (2006.01)
*B25J 9/16* (2006.01)
*G05D 1/02* (2020.01)
*G05D 1/00* (2006.01)
*B62D 57/024* (2006.01)

(52) U.S. Cl.
CPC ......... *B62D 57/024* (2013.01); *G05D 1/0088* (2013.01); *G05D 1/0221* (2013.01)

(58) Field of Classification Search
CPC .......... G05D 2201/02; G05B 19/41895; G05B 2219/40298; G05B 2219/45098; G05B 2219/45084; G05B 2219/50393; Y10S 901/01
See application file for complete search history.

(56) References Cited

U.S. PATENT DOCUMENTS

2015/0105940 A1* 4/2015 Takase ................. B62D 57/024
  701/1
2017/0313303 A1* 11/2017 Valtanen .............. G05D 1/0891

* cited by examiner

METHOD FOR MAINTAINING STABILITY OF MOBILE ROBOT AND MOBILE ROBOT THEREOF

CROSS-REFERENCE TO RELATED APPLICATION

This application claims the benefit of Korean Patent Application No. 10-2019-0084938, filed on Jul. 15, 2019, in the Korean Intellectual Property Office, the disclosure of which is incorporated herein in its entirety by reference.

BACKGROUND OF THE INVENTION

Field of the Invention

The present invention relates to a method and a device for ensuring stability of a mobile robot capable of moving on the ground.

Related Art

When there are stuff to transport, a user is able to transport the stuff easily by use of a mobile robot despite a load of the stuff. Such a mobile robot may include a wheel and transport the loads based on an external force applied by a user. Further, the mobile robot may include a receiving part and the user may be easily transport the load of the stuff by receiving the stuff in the receiving part.

If moving the mobile robot loaded with the stuff in a horizontal direction, the user may easily transport the stuff using the wheel without great friction. If a ground surface forms a predetermined angle, the user may apply a greater external force to the mobile robot, thereby transporting the stuff.

The farther the receiving part of the mobile robot is away from the ground surface, the more distal the center of mass of the mobile robot is from the ground surface. Accordingly, it may be difficult for the mobile robot to keep in balance depending on the ground surface.

SUMMARY OF THE INVENTION

The present invention aims to effectively controlling a center of mass of a mobile robot when the mobile robot is not in balance due to a ground condition or the like, thereby enabled to controlling stability of the mobile robot and preventing the mobile robot from overturning.

In one general aspect of the present invention to address the above-described object, there may be provided a mobile robot having a receiving unit and capable of moving, the mobile robot including: at least three wheels arranged at a lower portion of the mobile robot; a sensing unit configured to measure a weight of the mobile robot applied to each of the at least three wheels; a linear actuator connected to the receiving unit and configured to apply a linear motion to the receiving unit in a direction toward a front section or a rearward section of the mobile robot; and a processor configured to, based on the weight applied to each of the at least three wheels measured by the sensing unit, control the linear actuator so as to apply the linear motion to the receiving unit.

In yet another general aspect of the present invention to address the above-described object, there may be provided a method for controlling a center of mass of a mobile robot, the method including: measuring weights of the mobile robot applied to at least three wheels arranged at a lower portion of the mobile robot; and, based on a weight applied to each of the at least three wheels, controlling a linear actuator so as to apply a linear motion to a receiving unit included in the mobile robot in a direction toward a front section or a rear section of the mobile robot.

In yet another general aspect of the present invention in order to achieve the above object, there may be provided a non-volatile computer readable storage medium in which a computer program for implementing a method for controlling a center of mass of a mobile robot.

According to various embodiments described in the present invention, stability of the mobile robot in a sloped ground surface may be ensured.

DESCRIPTION OF EXEMPLARY EMBODIMENTS

Figure 1:
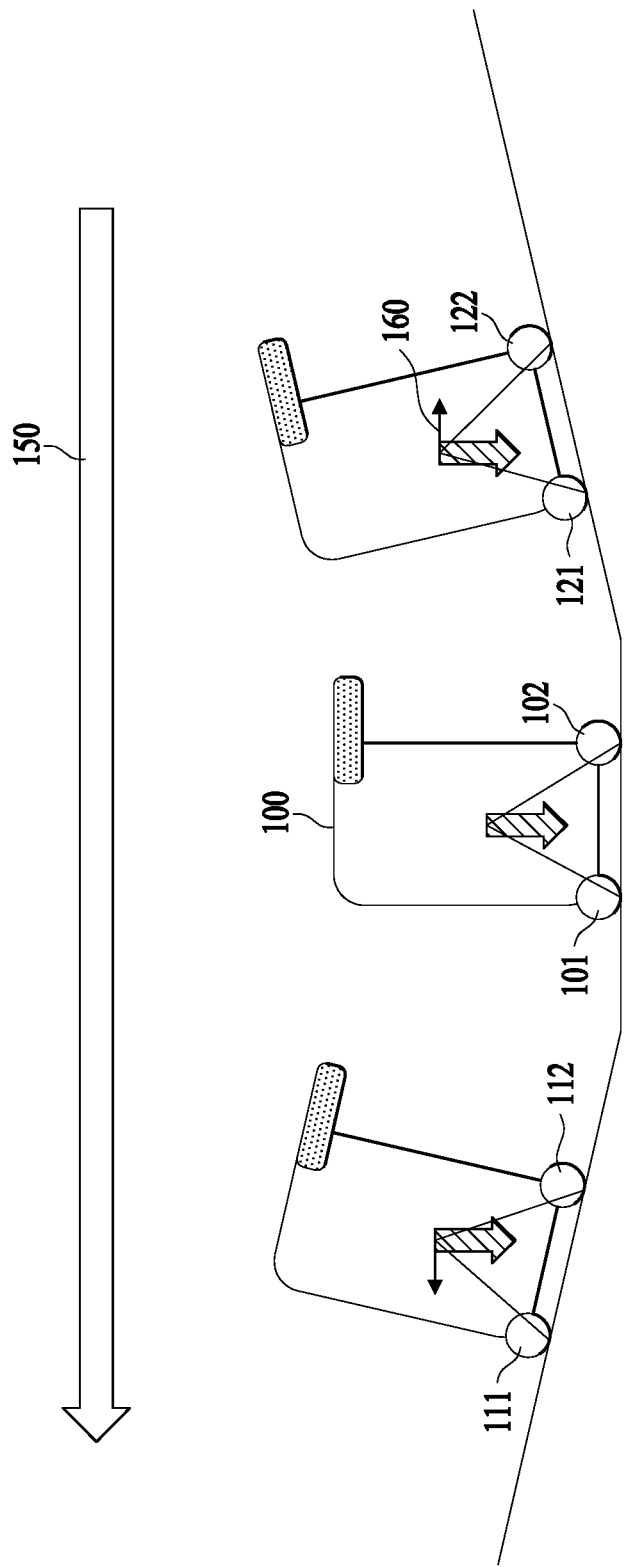
FIG. 1 illustrates changes in the center of mass of a mobile robot according to an embodiment of the present invention while the mobile robot moves on a slope.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A suffix "unit" used in the following description may be used to refer to elements or components. Use of such a suffix herein is merely intended to facilitate description of the specification, and the suffix itself is not intended to give any special meaning or function.

The drawings and description are to be regarded as illustrative in nature and not restrictive. Like reference numerals designate like elements throughout the specification. In addition, embodiments of the present invention will be described in detail with reference to exemplary drawings. In the drawings, like reference numerals denote like elements. Moreover, detailed descriptions related to well-known functions or configurations will be ruled out in order not to unnecessarily obscure subject matters of the exemplary embodiments.

In the description of the constituent elements of the embodiments of the present disclosure, it is possible to use terms such as first, second, A, B, (a), (b) and the like. These terms are just to distinguish the constituent elements from any other constituent elements but do not limit the nature or sequence or order and the like of corresponding features by the terms. Additionally, it should be also understood that the expression that some constituent element is "connected", "coupled" or "joined" to another constituent element means that some constituent element may he directly connected or joined to another constituent element or is also "connected", "coupled" or "joined" to another constituent element through a further component therebetween.

In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Further, in implementing this application, for convenience of explanation, the component will be described by being subdivided; however, these components may be implemented in a device or a module, or a component may be implemented by being divided into a plurality of devices or modules.

Before describing the present invention, main terms according to the present invention will be described.

The term "receiving unit" may be defined as a predetermined space where a predetermined object or cargo can be received in a mobile robot. According to an embodiment, a receiving unit may be opened at the top and may be disposed at a predetermined distance from an exterior of the mobile robot in consideration of a space where the receiving unit can be moved inside the mobile robot.

The term "linear actuator" may be a configuration connected to the receiving unit for applying linear motion to the receiving unit. According to an embodiment, a linear actuator may be coupled to an exterior or interior of a mobile robot. According to an embodiment, it is apparent to those skilled in the art that the linear actuator may include various types of linear actuator that can cause the receiving unit to linearly move, for example, a mechanical actuator, a hydraulic actuator, a pneumatic actuator, a piezoelectric actuator, an electro-mechanical actuator, etc.

The term "linear guide" may be disposed adjacent to the receiving unit and may guide a moving path to allow the receiving unit to be stably moved when the receiving unit is moved by the linear actuator. According to an embodiment, a single linear guide may be provided, and the linear guide may be disposed adjacent to at least one surface of the receiving unit to thereby guide a linear motion of the receiving unit.

The term "driving unit" may be defined as an element for providing a driving force to a wheel so that a mobile robot can automatically move even though a user does not apply an external force. The driving unit may be implemented in various aspects so as to apply driving power to a wheel within a range easily adopted by those skilled in the art.

The term "Artificial Intelligence (AI)" refers to artificial intelligence or a field for studying a methodology therefor. The term "machine learning" refers to a field for defining various problems addressed in the AI field and studying a methodology for solving the problems. The machine learning may be defined as an algorithm that constantly performs a specific task and thus improves performance with respect to the specific task.

The term "Artificial Neural Network (ANN)" may include an input layer, an output layer, and selectively one or more hidden layers. Each layer includes one or more neurons, and the ANN may include a synapse that connects one neuron and another neuron. In the ANN, each neuron may output a function value with respect to input signals, a weight, and a deviation which are input through a synapse.

Artificial Intelligence (AI) may refer to overall models used in machine learning and having problem solving capabilities, each model which consists of artificial neurons (nodes) that forms a network through synapse connection. The ANN may be defined a connection pattern between neurons on different layers, by a learning procedure of updating a model parameter, and by an activation function of generating an output value.

The model parameter refers to a parameter determined through learning, and may include a weight of synapse connection, a deviation of neurons, etc. In addition, a hyper parameter refers to a parameter that needs to be set before learning by a machine learning algorithm, and may include a learning rate, a reputation number, a mini-batch size, an initialization function, etc.

The purpose of learning of the artificial neural network may be determining a model parameter that minimizes a loss function. The loss function may be used as an index for determining an optimal model parameter for a learning process in the artificial neural network.

The machine learning may be classified into supervised learning, unsupervised learning, and reinforcement learning.

The map learning refers to a method for training an artificial neural network with a given label for training data, and the label may refer to an answer (or a result value) which the artificial neural network needs to infer when the training data is input to the artificial neural network. The unsupervised learning may refer to a method for training an artificial neural network without a given label for training data. The reinforcement learning may refer to a learning method that enables an agent, defined in a certain environment, to select an action or an order of actions so as to maximize accumulative rewards in each state.

Machine learning implemented as a Deep Neural Network (DNN) including a plurality of hidden layers among artificial neural networks may be referred to as deep learning, and the deep learning is a part of machine learning. Hereinafter, machine learning means including deep learning.

The term "self-driving" or "autonomous-driving" refers to a technology of driving autonomously, and a self-driving or autonomous-driving vehicle refers to a vehicle capable of driving without a user's manipulation or minimum manipulation.

For example, self-driving may include a technology of maintaining the currently drive lane, a technology of automatically controlling a speed, such as adaptive cruise control, a technology of automatically driving along a predetermined path, a technology of automatically set a path when a destination is set, etc.

A vehicle may encompasses a vehicle having only an internal combustion engine, a hybrid vehicle having both an internal combustion engine and an electric motor, and an electric vehicle having only an electric motor, and may include not just a passenger car but also a train, a motorcycle, etc.

In this case, the self-driving vehicle may be regarded a robot having a self-driving function.

The term "eXtended Reality (XR)" is the generic term that refers to Virtual Reality (VR), Augmented Reality (AR), and Mixed Reality (MR). VR technology provides a real-world object or background only as a CG image, AR technology provides a virtually created CG image over a real-world object image, and MR technology is a computer graphic technology for mixing and combining virtual objects in real world.

The MR technology is similar to the AR technology in that a real-world object and a virtual object are displayed together. Yet, the MR technology is different from the AR technology in that a virtual object and a real-world object are used with equal characteristics in the MR technology, whilst a virtual object is used to supplement a real-world object in the AR technology.

The XR technology may apply to a Head-Mount Display (HMD), a Head-Up Display (HUD), a mobile phone, a tablet PC, a laptop computer, a desktop computer, a TV, a digital signage, etc., and a device with the XR technology applied may be referred to as an XR device.

Hereinafter, various embodiments of the present invention will be described with reference to the accompanying drawings.

FIG. 1 illustrates changes in the center of mass of a mobile robot 100 according to an embodiment of the present invention while the mobile robot 100 moves on a slope. The shape of the mobile robot 100 in FIG. 1 is understood as being viewed from the side.

According to an embodiment, the mobile robot 100 may easily move by its own driving power through wheels 101 and 102, which is capable of rotating about a shaft positioned between the wheels 101 and 102, or by an external force applied by a user.

According to an embodiment, in order for the mobile robot 100 to keep remaining on a slope, an additional force is required. For example, if the mobile robot 100 is positioned on an uphill slope, a wheel 112 arranged in a rear section with reference to a moving direction 150 is subject to greater pressure than a wheel 111 arranged in a front section. Thus, in order to prevent the mobile robot 100 from overturning in a direction opposite to the moving direction 150, a user needs to move the center of mass of the mobile robot 100 in the moving direction 150.

According to another embodiment, if the mobile robot 100 is positioned on a downhill slope, a wheel 121 arranged in a rear section with reference to the moving direction 150 is subject to greater pressure than a wheel 122 arranged in a front section. Thus, in order to prevent the mobile robot 100 from overturning, a user needs to move the center of mass of the mobile robot 100 in a direction opposite to the moving direction 150.

However, the greater the inclination of an area on which the mobile robot 100 is positioned, the greater the external force is required to be applied by a user in the direction opposite to the moving direction. The greater the weight of the mobile robot 100, the more difficult it would be for the user to control the center of mass of the mobile robot 100.

In order to solve this problem, the present invention may adjust a height of the mobile robot 100 from a ground surface, so that the center of mass of the mobile robot 100 can be located in a stable region.

Figure 2:
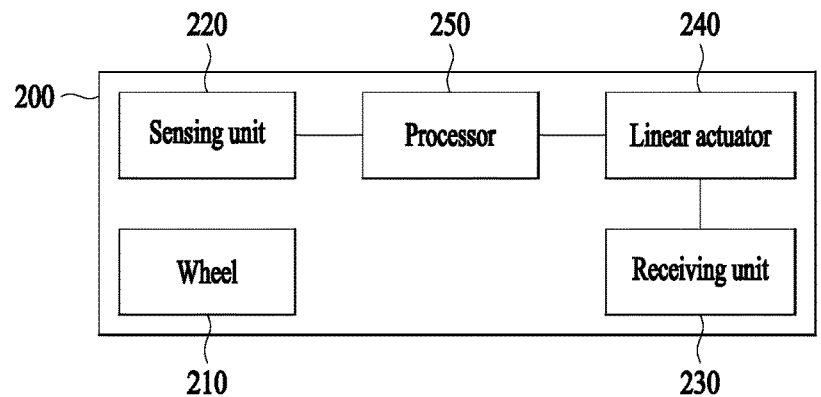
FIG. 2 illustrates a block diagram of a mobile robot capable of controlling the center of mass thereof according to an embodiment of the present invention.

FIG. 2 illustrates a block diagram of a mobile robot 200 capable of controlling the center of mass of the mobile robot 200 according to an embodiment of the present invention. FIG. 2 illustrates a relationship of elements used in the mobile robot 200 or a relationship by which predetermined information is transmitted or received by a processor 250. Accordingly, a driving mechanism according to physical connection inside the mobile robot 200 can be understood using the following description or embodiments.

According to an embodiment, the mobile robot 200 may include: at least three wheels 210 arranged at a lower portion of the mobile robot 200 so as to move the mobile robot 200; a sensing unit 220 for measuring a weight of the mobile robot 200 applied to each of the at least three wheels 210; a receiving unit 230 having a predetermined space; a linear actuator 240 connected to the receiving unit 230 to apply linear motion to the receiving unit 230 in a direction toward a front section and a rear section of the mobile robot 200; and a processor 250 configured to control the linear actuator 240 to apply linear motion to the receiving unit 230 based on a weight applied to each of the at least three wheels 210 measured by the sensing unit 220.

According to an embodiment, the at least three wheels 210 may not be arranged in a straight line but may be arranged at a lower end of the mobile robot 200 so that a line connecting the at least three wheels 210 form a 2D plane. For example, in a case where the number of wheels 210 is three, a front section and a rear section may be divided with reference to a moving direction of the mobile robot 200 and one wheel 210 may be arranged in the front section and two wheels 210 may be arranged in the rear section. However, the exemplary number and arrangement of the wheels are merely for explaining that the at least three wheels 210 are arranged to form a 2D plane, and thus, the present invention are not limited the exemplary number and arrangement of the wheels.

According to an embodiment, the sensing unit 220 may measure a weight of the mobile robot 200 applied to each of the at least three wheels 210 and transmit the measurement to the processor 250. The sensing unit 220 capable of measuring a weight can be implemented in various shapes within a range which those skilled in the art can easily realize. According to an embodiment, the sensing unit 220 may be disposed in a member which includes the at least three wheels 210 and supports the mobile robot 200, and, in this case, the sensing unit 220 may be provided in number identical to the number of the at least three wheels 210. In addition, the sensing unit 220 may be a configuration including various types of sensor capable of measuring a weight or pressure being applied to the at least three wheels 210. According to an embodiment, the sensing unit 220 may include various elements capable of measuring a weight applied to each of the at least three wheels 210, based on pressure applied to a one-dimensional, two-dimensional, or three-dimensional direction.

According to an embodiment the receiving unit 230 may be a configuration having a predetermined space where a user can receive a predetermined object, and may be moved by receiving an external force from the linear actuator 240.

According to an embodiment, the linear actuator 240 may be a configuration including various types of actuator connected to the receiving unit 230 and capable of linearly moving the receiving unit 230. According to an embodiment, a single linear actuator 240 may be included in the mobile robot 200 and may move the receiving unit 230 in a direction toward a front section or a rear section of the mobile robot 200. According to an embodiment, the linear actuator 240 may be disposed in such a way as to move the receiving unit 230 not just in a direction toward the front section or the rear section of the mobile robot 200 but also in a direction toward a left section or a right section of the mobile robot 200.

According to an embodiment, the processor 250 may control elements included in the mobile robot 200 to perform various embodiments that can be performed by various elements included in the mobile robot 200. That is, in various embodiments described below, it is understood that operation of the mobile robot 200 is based on a control operation by the processor 250. According to an embodiment, the processor 250 may include at least one of an RAM, an ROM, a CPU, a GPU (Graphic Processing Unit), or a BUS, and they may be connected to each other.

According to an embodiment, the processor 250 may control the linear actuator 240 so as to adjust a position of the receiving unit 230 included in the mobile robot 200 based on a weight measured by the sensing unit 220, so that a center of mass of the mobile robot 200 can be controlled stably. According to an embodiment, the processor 250 may control the linear actuator 240 so that the center of mass of the mobile robot 200 does not move out of a line connecting the at least three wheels 210 on a plane vertical to a direction of gravity. As such, the processor 250 may control the linear actuator 240 so as to perform an operation for controlling the center of mass of the mobile robot 200, and various embodiments where the linear actuator 240 is controlled will be hereinafter described with various examples.

According to an embodiment, the processor 250 may calculate a point at which the center of mass of the mobile robot 200 is located based on a weight measured by the sensing unit 220. According to an embodiment, the processor 250 may be aware of arrangement shape of at least one wheel 210 of the mobile robot 200 in advance and may calculate the center of mass of the mobile robot 200 based on a weight measured by the sensing unit 220 and arrangement shape of the at least three wheels 210. For example, as the center of mass of the mobile robot 200 viewed from above in a vertical direction is determined in relation with arrangement shape of the at least three wheels 210, it may be possible to determine as to whether the center of mass of the mobile robot 200 is located within a stable region formed by the at least three wheels 210. A method for calculating the center of mass of the mobile robot 200 by the processor 250 may include various methods that can be easily made by those skilled in the art pertaining to the same technical field of the present invention.

According to an embodiment, in order to provide electric power required to operate various elements including the sensing unit 220, the linear actuator 240, and the processor 250 of the mobile robot 200, the mobile robot 200 may receive electric power from an external resource or may utilize a battery (not shown) included in the mobile robot 200.

Figure 3:
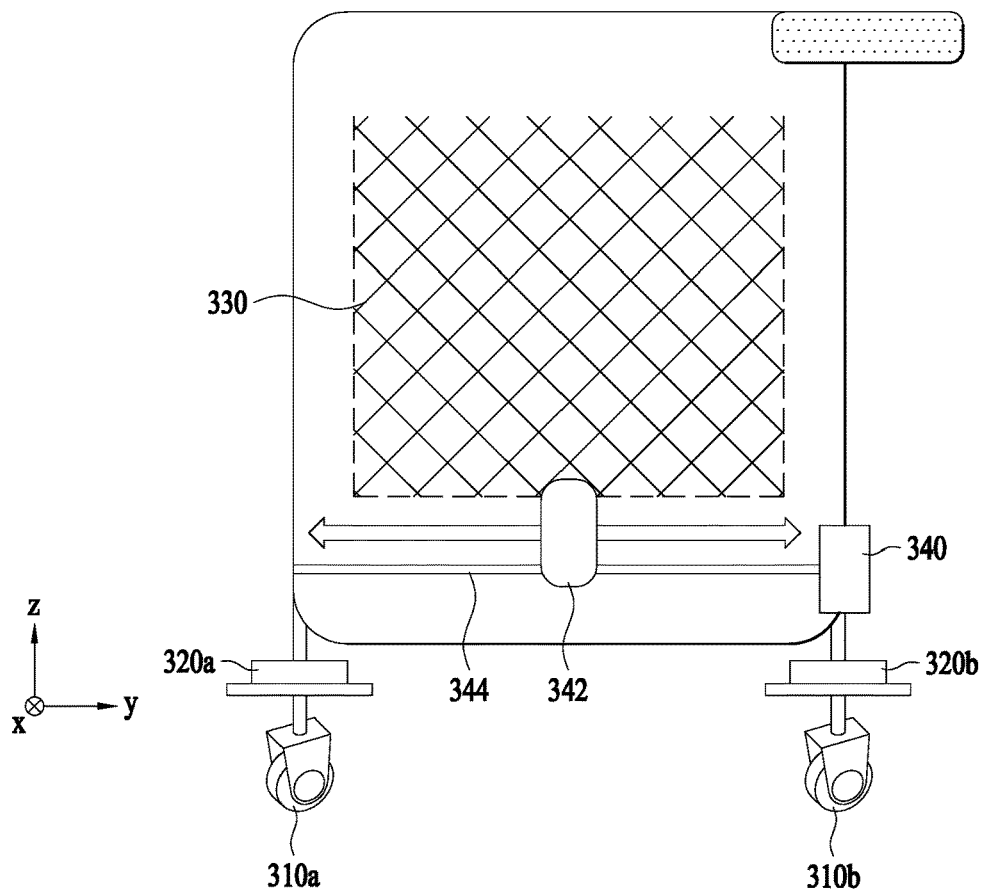
FIG. 3 illustrates a side view of a mobile robot capable of controlling the center of mass thereof according to an embodiment of the present invention.

FIG. 3 illustrates a side view of a mobile robot 300 capable of controlling a center of mass thereof according to an embodiment of the present invention. The mobile robot 300 of FIG. 3 corresponds to an example of the mobile robot 200 implemented by the elements included in the block diagram of FIG. 2, and thus, the number of elements included in the mobile robot 300 of the present invention and arrangement of the elements are merely exemplary. Therefore, the number of elements included in the mobile robot 300 of the present invention and arrangement of the elements should not be interpreted to be limited to the example shown in FIG. 3, and the example of FIG. 3 should be understood as an example for explaining features of the present invention.

Referring to FIG. 3, the mobile robot 300 may include wheels 310a and 310b arranged at a lower portion, sensing units 320a and 320b disposed in the wheels, a receiving unit 330, and a linear actuator 340.

According to an embodiment, the mobile robot 300 may be divided into configurations 310a and 320a disposed in a front section and configurations 310b and 320b disposed in a rear section with reference to a moving direction (that is, a Y-axis direction).

According to an embodiment, the receiving unit 330 is capable of moving in a direction toward the front section or the rear section, the linear actuator 340 may be a configuration for linearly moving the receiving unit 330, and a connection portion 342 included in the linear actuator 340 may be coupled to the receiving unit 330. The linear actuator 340 may move the connection portion 342 along a predetermined linear member 344 disposed in the moving direction of the mobile robot 300, and accordingly, linear motion of the receiving unit 330 may be applied by movement of the connection portion 342.

According to an embodiment, the processor 250 of the mobile robot 300 may measure a weight applied to each wheel of the mobile robot 300 measured by the sensing units 320a and 320b of the wheels 310a and 310b, and move the receiving unit 300 through the linear actuator 340. In the case of moving a position of the receiving unit 330 through the linear actuator 340, a center of mass of the mobile robot 300 may be moved in a direction toward the front section or the rear section of the mobile robot 300. Accordingly, as the center of mass of the mobile robot 300 biased toward a certain side surface is moved in an appropriate direction before moving of the receiving unit 330, stability of the mobile robot 300 may be ensured.

Figure 4:
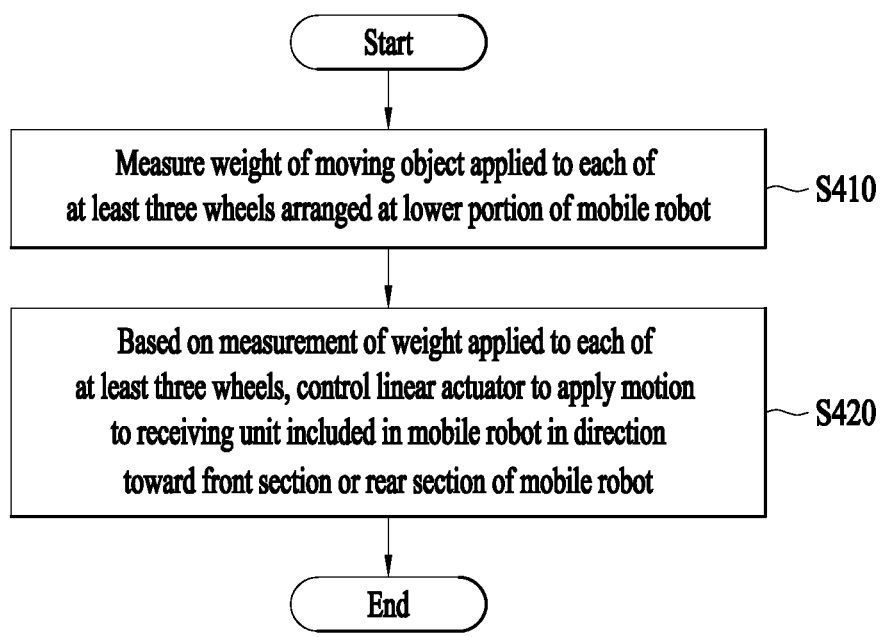
FIG. 4 is a flowchart of a method for controlling a center of mass of a mobile robot according to an embodiment of the present invention.

FIG. 4 is a flowchart of a method for controlling a center of mass of the mobile robot 200 according to an embodiment of the present invention.

In step 410, the mobile robot 200 may measure weights of the mobile robot 200 applied to at least three wheels 210, arranged at a lower portion of the mobile robot 200 to form a predetermined plane, through the sensing unit 220 according to an embodiment. Using a weight measured at each wheel 210, the processor 250 may determine a wheel toward which mass is biased, that is, a direction toward which a center of mass of the mobile robot 200 is biased.

In step S420, based on a weight applied to each of the at least three wheels 210 measured in step S410, the processor 250 of the mobile robot 200 may control the linear actuator 240 to apply motion to the receiving unit 230 included in the mobile robot 200 in a direction toward the front section or the rear section of the mobile robot 200. The center of mass of the mobile robot 200 may be stably changed by moving the receiving unit 230 in a direction opposite to a direction toward which the mass of the mobile robot 200 placed on a sloped ground is biased, and accordingly, it is possible to prevent the mobile robot 200 from overturning by a small amount of external force.

According to an embodiment, the processor 250 may control the linear actuator 240 so that uniform weights can be applied to the at least three wheels 210 of the mobile robot 200. According to an embodiment, a center of mass of the mobile robot 200 positioned on a level ground may not be substantially located at the center of arranged positions of the at least three wheels 210. For example, even on the level ground, the center of mass of the mobile robot 200 may be biased toward the front section or the rear section because of leaning of cargoes received in the receiving unit 230. In this case, a weight applied to each of the at least three wheels 210 may differ even on the level ground. Thus, in a case where the mobile robot 200 is positioned on a slope and thereby a center of mass thereof is substantially located at the center of arranged positions of the at least three wheels 210, the linear actuator 240 may not adjust a position of the receiving unit 230.

Figure 5A:
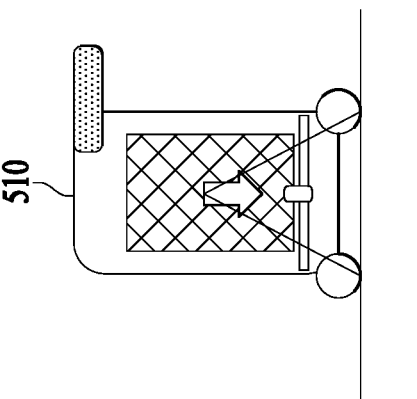
FIGS. 5(a) and 5(b) illustrate a procedure of controlling a center of mass of a mobile robot.
Figure 5A:
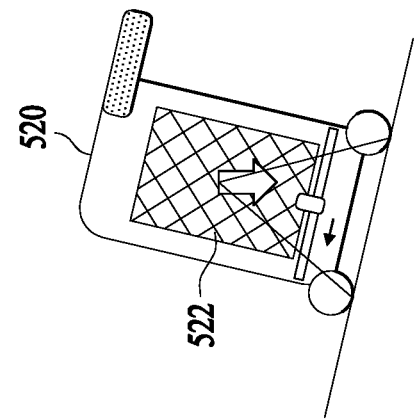
Figure 5A:
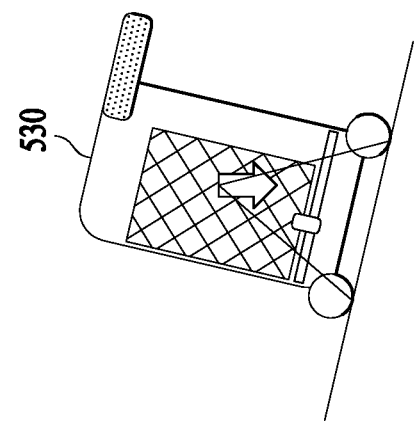
Figure 5B:
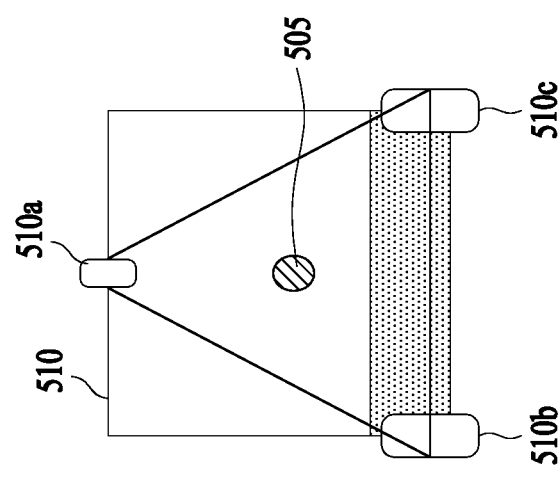
Figure 5B:
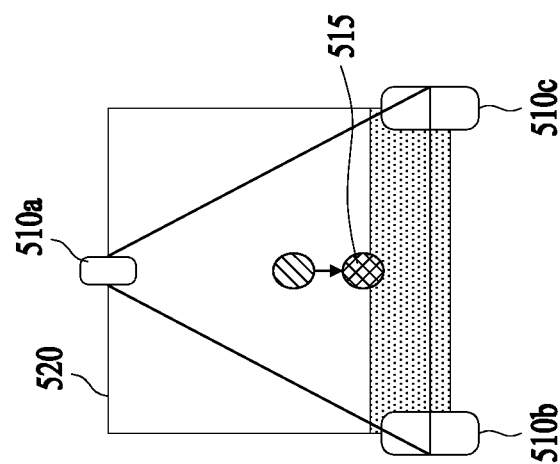
Figure 5B:
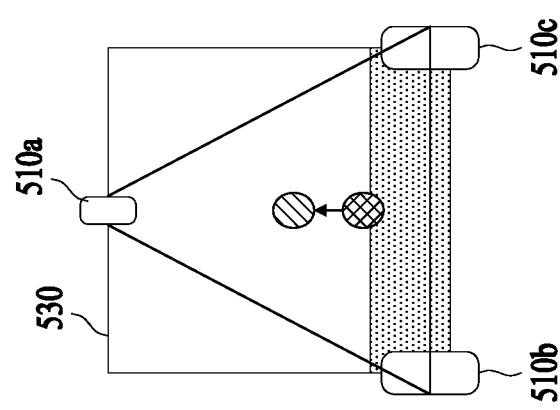

FIGS. 5(a) and 5(b) illustrate a procedure in which the mobile robot 200 controls a center of mass thereof by adjusting a position of the receiving unit 230 in a vertical direction by the mobile robot 200. According to an embodiment, FIG. 5(a) illustrates the mobile robot 200 viewed from a side when the mobile robot 200 moves from a level ground to an uphill slope, and FIG. 5(b) illustrates the mobile robot 200 viewed from a plane in the same situation. Mobile robots 510, 520, and 530 in situations shown in FIG. 5 may correspond to the mobile robot 200 of FIG. 2.

According to an embodiment, wheels 510a, 510b, and 510c in the mobile robot 510 moving on a level ground are in horizontal to each other, and, when viewed on the level ground, a center of mass 505 of the mobile robot 510 may be positioned within a region formed by connecting the wheels 510a, 510b, and 510c.

According to an embodiment, as for the mobile robot 520 positioned on an uphill slope, weights applied to the wheels 510b and 510c arranged in a rear section may be greater than a weight applied to the wheel 510a arranged in a front section, and this is on the basis of the fact that the weight applied to the wheel 510a arranged in the front section is reduced whilst the weights applied to the wheels 510b and 510c arranged in the rear section is increased. As such, when the mobile robot 520 enters the uphill slope, a center of mass 515 of the mobile robot 520 may be biased relatively further rearward compared to the center of mass 505 of the mobile robot 510 positioned on a level ground, and this may be determined by the processor 250 on the basis that weights applied to the wheels 510b and 510c arranged in the rear section is greater than a weight applied to the wheel 510a arranged in the front section.

According to an embodiment, the mobile robot 530 may control the center of mass thereof by controlling the linear actuator 240 so as to move the receiving unit 522 in a direction opposite to a direction in which the rear wheels 510b and 510c are arranged, so that the center of mass is moved in a direction opposite to the rear wheels 510b and 510c to which a relative greater weight is applied. To this end, the processor 250 may control the linear actuator 240 so that the center of mass 515 of the mobile robot 530 positioned on the uphill slope moves again toward a center of mass 505 of the mobile robot 530 positioned on the level ground. In this case, a deviation of weights applied to the wheels 510a, 510b, and 510c of the mobile robot 530 may be reduced by adjusting a position of the receiving unit 522 of the mobile robot 530.

According to an embodiment, a change in the center of mass (see FIG. 5(b)) may be visually or audibly output to a user through an output unit (not shown) of the mobile robot 200. According to an embodiment, a current center of mass and a stable region may be displayed in real time on a display (not shown) attached to the mobile robot 200. According to an embodiment, in a case where the center of mass of the mobile robot 200 is biased somewhat toward a part of the wheel 210 and thereby positioned within a predetermined distance from the stable region, an alarm signal may be output audibly so that a user can be aware of the situation.

Figure 6:
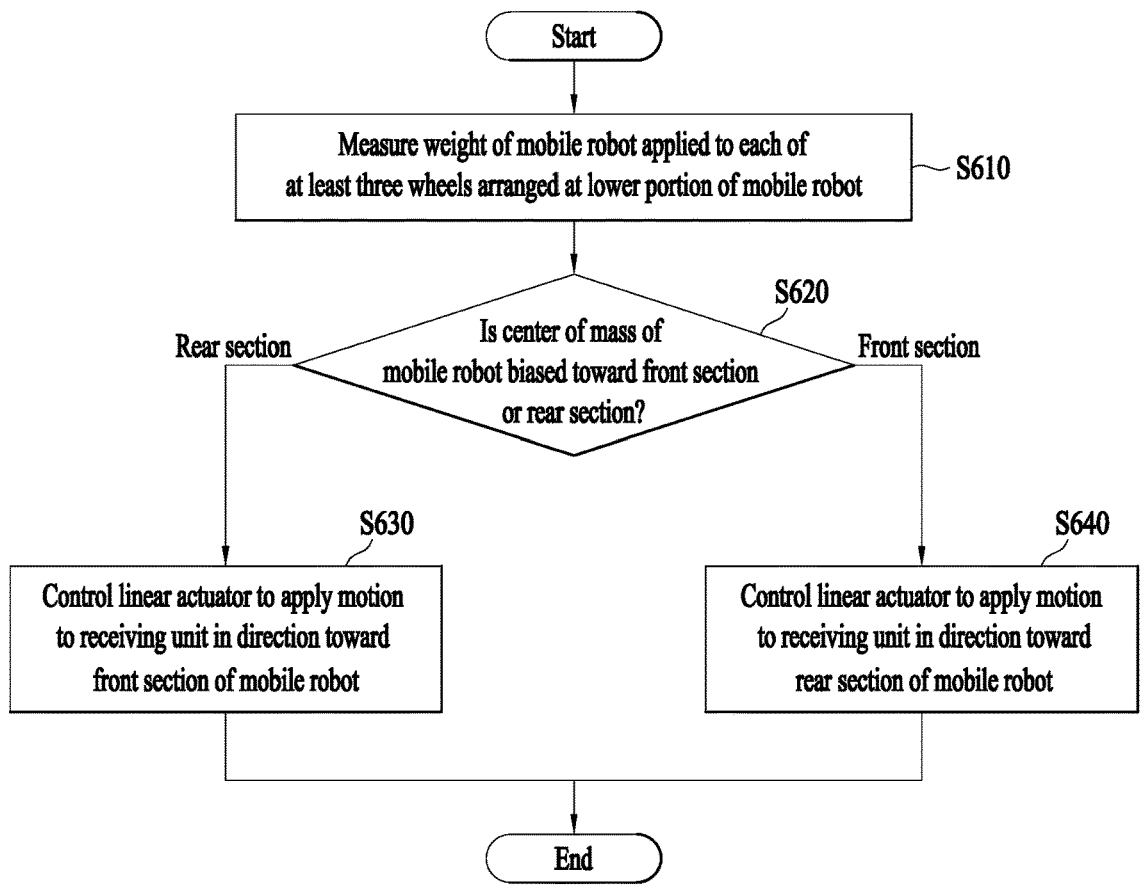
FIG. 6 is a flowchart of a method for controlling a linear actuator to enable the receiving unit to move in a direction toward the front section or the rear section of the mobile robot by measuring a weight applied to each of the at least three wheels according to an embodiment of the present invention.

FIG. 6 is a flowchart of a method for controlling a linear actuator 240 to enable the receiving unit 230 to move toward the front section or the rear section of the mobile robot 200 by measuring a weight applied to each of the at least three wheels 210 according to an embodiment of the present invention.

In step S610, the mobile robot 200 may use the sensing unit 220 to measure a weight of the mobile robot 200 applied to each of the at least three wheels 210 arranged at the lower portion of the mobile robot 200 according to an embodiment of the present invention. The feature of the step S610 may be identical or similar to the feature of the step S410 of FIG. 4, and thus a detailed description thereof is omitted.

In step S620, the mobile robot 200 may determine whether the center of mass of the mobile robot 200 is biased toward the front section or the rear section, according to an embodiment of the present invention. A method for determining a direction in which the center of mass of the mobile robot 200 is biased has been described with reference to a processing procedure performed by the processor 250 using information on a weight measured by the sensing unit 220, and thus, a detailed description thereof is herein omitted.

According to an embodiment, when it is determined in the step S620 that the center of mass of the mobile robot 200 is biased toward the rear section, the mobile robot 200 may control the linear actuator 240 so as to apply a motion toward the front section of the mobile robot 200 to the receiving unit 230 in step S630. According to an embodiment, when it is determined in the step S620 that the center of mass of the mobile robot 200 is biased toward the front section, the mobile robot 200 may control the linear actuator 240 so as to apply a motion to the receiving unit 230 so that the receiving unit 230 moves toward the rear section of the mobile robot 200 in step S630.

Figure 7:
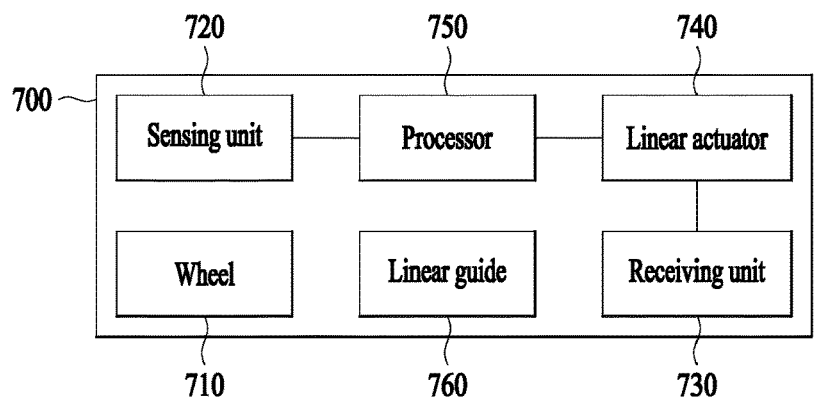
FIG. 7 shows a block diagram of a mobile robot of which a receiving unit is capable of moving toward a front section or a rear section along a linear guide according to an embodiment of the present invention.

FIG. 7 shows a block diagram of a mobile robot 700 of which a receiving unit 730 is capable of moving toward a front section or a rear section along a linear guide 760 according to an embodiment of the present invention. According to an embodiment, the features of a wheel 710, a sensing unit 720, the receiving unit, a linear actuator 740, and a processor 750 shown in FIG. 7 may be identical or similar to the features of the wheel 210, the sensing unit 220, the receiving unit 230, the linear actuator 240, and the processor 250 shown in FIG. 2, and thus, a detailed description thereof is herein omitted.

According to an embodiment the mobile robot 700 may further include the linear guide 760 capable of guiding linear motion of the receiving unit 730. According to an embodiment, at least one linear guide 760 may be included in the mobile robot 700 and may be arranged in a shape that can allow the mobile robot 700 to move in a predetermined direction. According to an embodiment, that is, the receiving unit 730 may be able to linearly move based on an arranged shape of the linear shape 760, and a direction in which the linear guide 760 is arranged may correspond to a direction of linear motion applied by the linear actuator 740.

According to an embodiment, the linear guide 760 may be arranged between an outer wall of the mobile robot 700 and the receiving unit 730. Thus, the linear guide 760 may be arranged in various directions, for example, a lower portion, a side portion, or an upper portion of the receiving unit 730. According to another embodiment, the linear guide 760 may be arranged at the lower portion of the receiving unit 730 so that the receiving unit 730 can be supported inside the mobile robot 700, and accordingly, the linear guide 760 may be brought into contact with the lower portion of the receiving unit 730.

According to an embodiment of the present invention, the linear guide 760 may include a predetermined block, and this block may be connected to the receiving unit 730 and allow the receiving unit 730 to easily move on the linear guide 760.

Figure 8A:
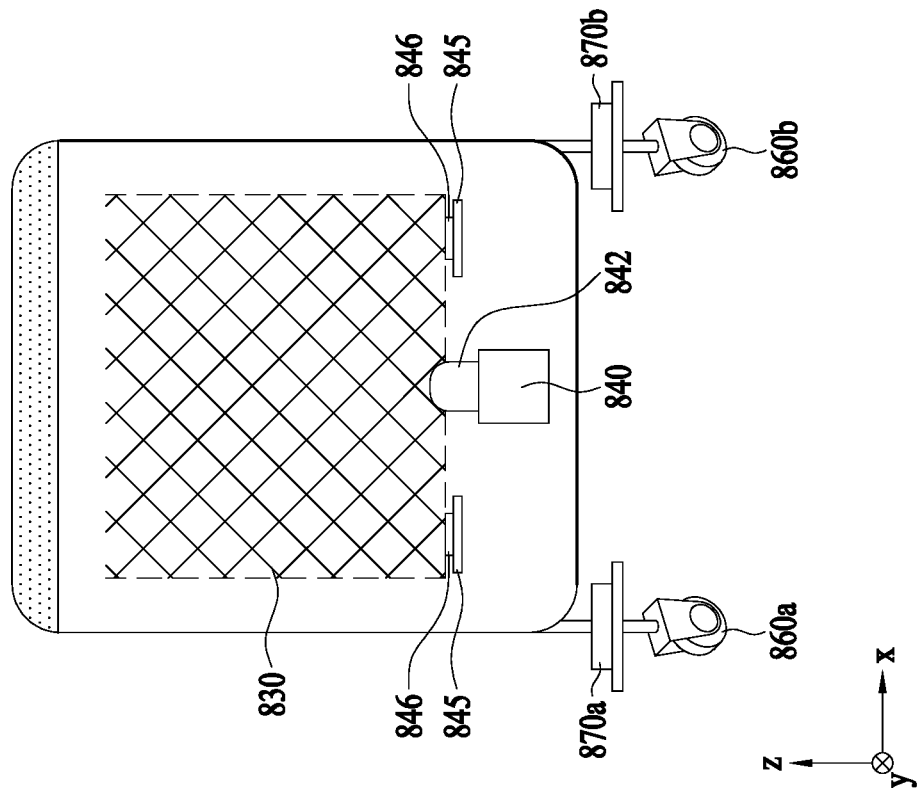
FIGS. 8(a) and 8(b) show a side view and a rear view of the mobile robot of which the receiving unit is capable of moving toward the front section and the rear section along the linear guide.
Figure 8B:
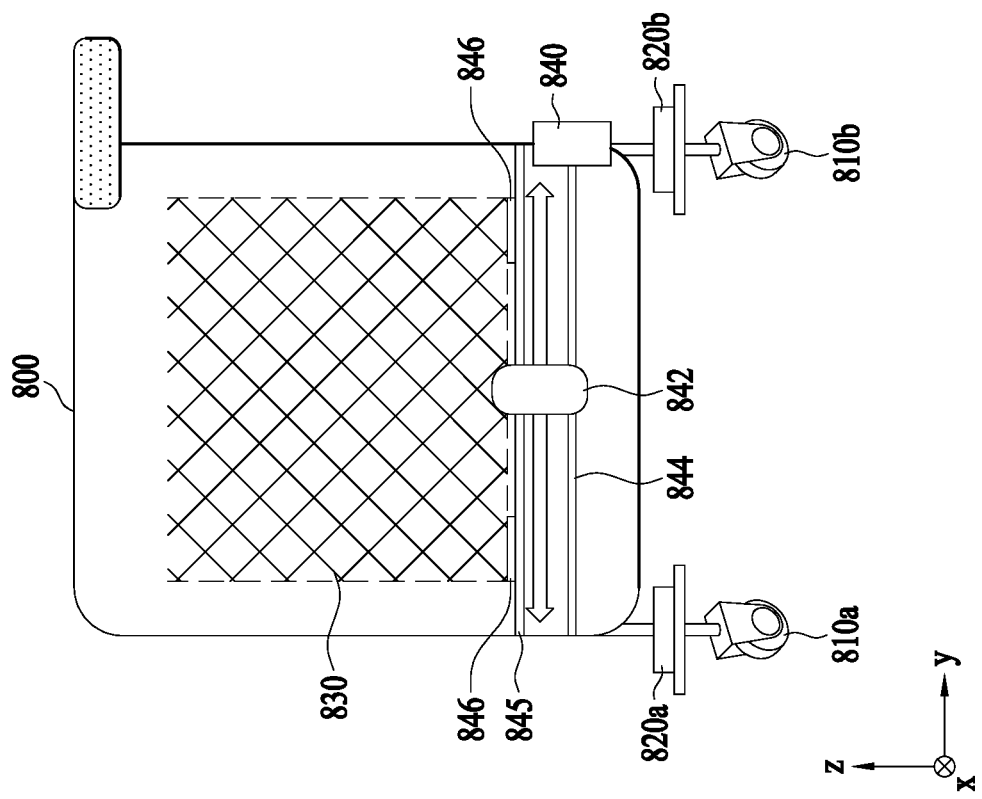

FIGS. 8(a) and 8(b) show a side view and a rear view of the mobile robot 800 of which the receiving unit 830 is capable of moving toward the front section and the rear section along the linear guide 845.

FIG. 8(a) is a side view of the mobile robot 800. Referring to FIG. 8(a), the mobile robot 800 may include wheels 810a and 810b arranged at a lower portion of the mobile robot 800, sensing units 820a and 820b arranged at the respective wheels 810a and 810b, the receiving unit 830, a linear actuator 840, and the linear guide 845.

According to an embodiment, the receiving unit 830 may be movable toward a front section or a rear section of the mobile robot 800, and the linear actuator 840 may be a configuration for linearly moving the receiving unit 830 and a connection portion 842 included in the the linear actuator 840 may be coupled to the receiving unit 830. The linear actuator 840 may move the connection portion 842 along a predetermined linear member 844 arranged in a moving direction of the mobile robot 800, and accordingly, the receiving unit 830 may receive linear motion upon movement of the connection portion 842.

According to an embodiment, the linear guide 845 may come into contact with the lower portion of the receiving unit 830, and accordingly, the mobile robot 800 may be supported inside by the linear guide 845. According to an embodiment, a direction in which the linear guide 845 is arranged may coincide with a direction in which a linear member 844 of the linear actuator 840 is arranged. According to an embodiment, the linear guide 845 may further include a predetermined block 846, and the block 846 may be connected to the receiving unit 830, so that the receiving unit 830 can allow the receiving unit 830 to easily and linearly move.

FIG. 8(b) is a rear view of the mobile robot 800. The mobile robot 800 may include wheels 860a and 860b and sensing units 870a and 870b, which are arranged on a left side surface or a right side surface of the mobile robot 800. According to an embodiment, a plurality of linear guides 845 may be included in the mobile robot 800 and may be disposed on any of various side surfaces of the receiving unit 830.

According to an embodiment, referring to FIG. 8(b), the linear guide 845 may be arranged at the lower portion of the receiving unit 830 and two linear guides 845 may be provided. According to an embodiment, the connection portion 842 of the linear actuator 840 connected to the receiving unit 830 and the linear member 844 may be arranged between linear guides 845. Each linear guides 845 may include a predetermined block 846, and a corresponding guide 845 and the receiving unit 830 may be connected through the the predetermined block 846.

Figure 9:
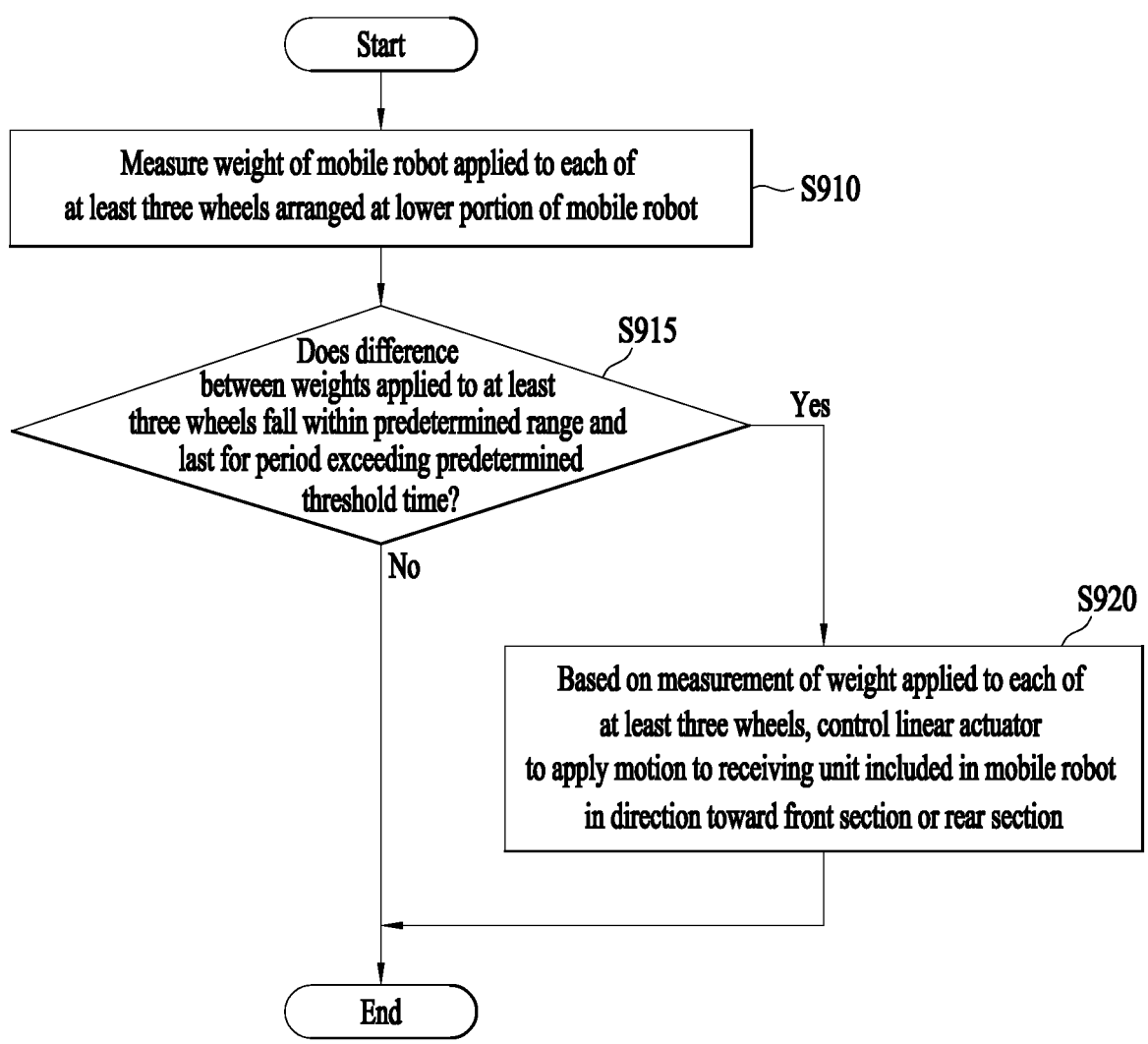
FIG. 9 is a flowchart of a procedure of determining whether to adjust a position of a receiving unit based on weight of a mobile robot applied to the at least three wheels according to an embodiment of the present invention.

FIG. 9 is a flowchart of a procedure of determining whether to adjust a position of the receiving unit 230 based on weight of the mobile robot 200 applied to the at least three wheels 210 according to an embodiment of the present invention.

In step S910, the mobile robot 200 according to an embodiment of the present invention may measure weight applied to each of at least three wheels 210 arranged at a lower portion of the mobile robot 200 by use of the sensing unit 220. The feature of the step S910 in FIG. 9 may be identical or similar to the feature of the step S410 in FIG. 4, and thus, a detailed description thereof is herein omitted.

According to an embodiment, the mobile robot 200 may determine in step S915 as to whether a difference between the weights applied to the at least three wheels 210 falls within a predetermined range and lasts for a period exceeding a predetermined threshold time. According to an embodiment, if a difference between weights measured on the wheels 210 when the mobile robot 100 shakes during movement or moves over a low-height protruding surface (for example, a berm) lasts for a short period of time, it may be preferable not to perform the above-described steps for changing a center of mass. Thus, the difference between weights applied to the wheels 210 falls within a predetermined range, and the processor 250 may control the linear actuator 240 to adjust the position of the receiving unit 230 as long as the difference lasts for a period exceeding a predetermined threshold time.

Figure 10:
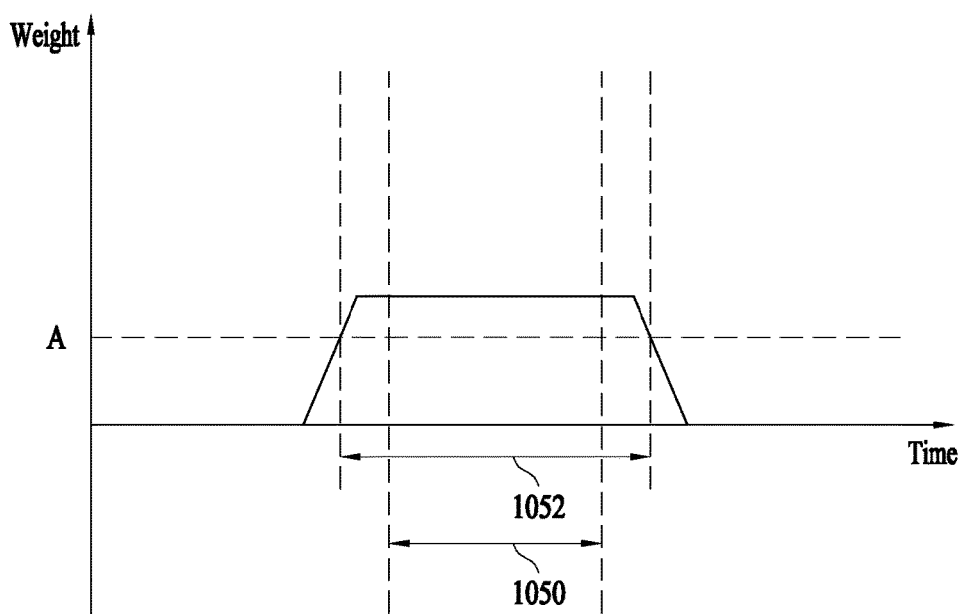
FIGS. 10(a), 10(b), and 10(c) are diagrams for comparing a case where the position of a receiving unit is determined to be adjustable and a case where the position of the receiving unit is determined to be not adjustable according to an embodiment of the present invention.
Figure 10:
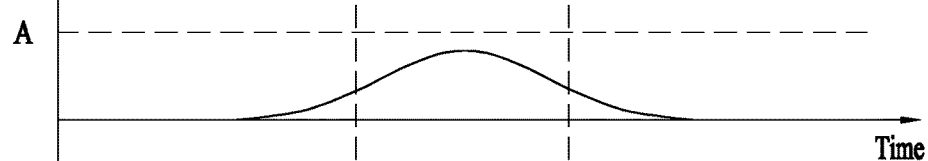
Figure 10:
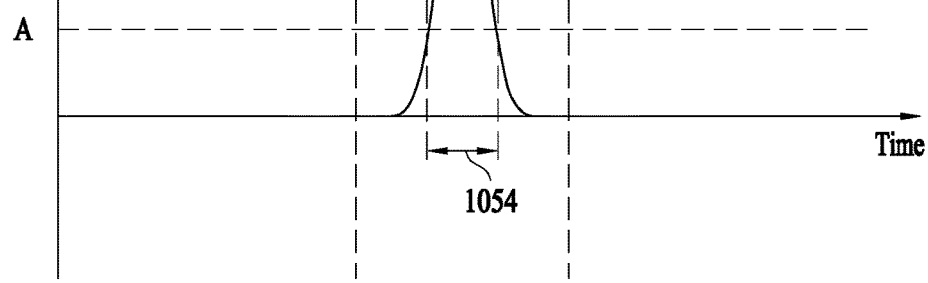

In this regard, FIGS. 10(a), 10(b), and 10(c) are diagrams for comparing a case where the position of the receiving unit 230 is determined to be adjustable and a case where the position of the receiving unit 230 is determined to be not adjustable according to an embodiment.

According to an embodiment, referring to FIG. 10(a), a difference between weights applied to the at least three wheels 210 of the mobile robot 200 falls within a range exceeding a predetermined weight A (for example, a difference between a weight applied to at least one wheel arranged in a front section of the mobile robot 200 and a weight applied to at least one wheel arranged in a rear section of the mobile robot 200 or a difference between a maximum value and a minimum value of a weight applied to the at least three wheels 210) falls within a range exceeding a predetermined weight A and lasts for a period 1052 exceeding a threshold time 1050. In this case, the mobile robot 200 may determine in step S915 that a difference between the weights applied to the at least three wheels 210 falls within the predetermined range and lasts for a period exceeding a predetermined threshold time.

According to an embodiment, referring to FIG. 10(b), the difference between the weights applied to the at least three wheels 210 of the mobile robot 200 does not exceed the predetermined weight A. In this case, the mobile robot 200 may determine in step S915 that the difference between the weights applied to the at least three wheels 210 of the mobile robot 200 falls within a predetermined range and does not last for a period exceeding the predetermined threshold time 1050.

According to an embodiment, referring to FIG. 10(c), the difference between the weights applied to the at least three wheels 210 of the mobile robot 200 exceeds the predetermined weight A, but a period 1054 for which the difference exceeds the predetermined weight A does not exceeds the threshold time 1050. In this case, the mobile robot may determine in step S915 that the difference between the weights applied to the at least three wheels 210 falls within the predetermined range and does not last for a period exceeding the predetermined threshold time 1050.

According to an embodiment, in step S920, if the difference between the weights applied to the at least three wheels 210 exists and lasts for a period exceeding the predetermined threshold time, the mobile robot 200 may control the linear actuator 240 to adjust the position of the receiving unit 230 (for example, in a direction toward the front section or the rear section of the mobile robot 200). The feature of step S920 in FIG. 9 may correspond to the feature of step S420 in FIG. 4, and thus, a detailed description thereof is herein omitted.

Figure 11:
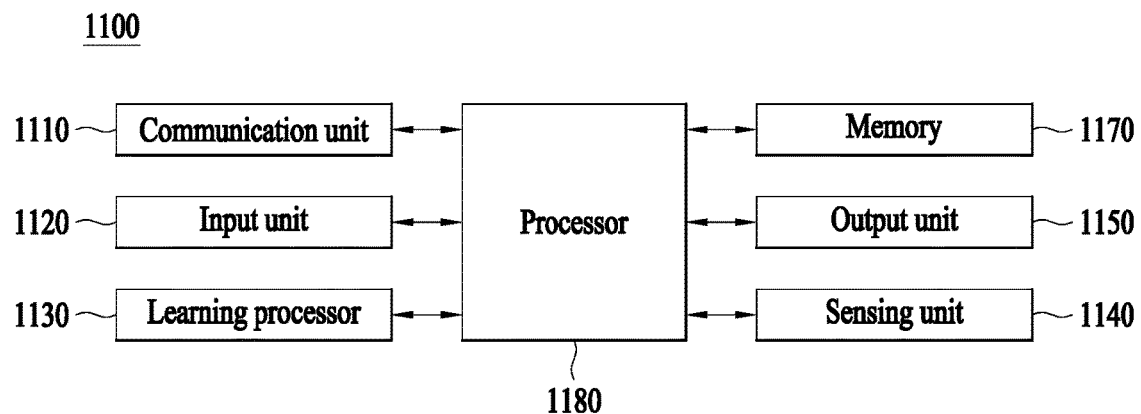
FIG. 11 shows an AI device according to an embodiment of the present invention.

FIG. 11 illustrates an AI device 1100 according to an embodiment of the present disclosure.

AI device 1100 of FIG. 11 may correspond to mobile robot 200 of FIG. 2, and some of constituent elements of FIG. 11, which are not included in mobile robot 200 of FIG. 2, may be selectively adopted within a range in which the embodiments of the present disclosure may be realized.

AI device 1100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 11, AI device 1100 may include a communication unit 1110, an input unit 1120, a learning processor 1130, a sensing unit 1140, an output unit 1150, a memory 1170, and a processor 1180, for example.

Communication unit 1110 may transmit and receive data to and from external devices, such as other AI devices 1300a to 1300e and an AI server 1200, using wired/wireless communication technologies. For example, communication unit 1110 may transmit and receive sensor information, user input, learning models, and control signals, for example, to and from external devices.

At this time, the communication technology used by communication unit 1110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 1120 may acquire various types of data.

At this time, input unit 1120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 1120 may acquire, for example, input data to be used when acquiring an output using learning data for model learning and a learning model. Input unit 1120 may acquire unprocessed input data, and in this case, processor 1180 or learning processor 1130 may extract an input feature as pre-processing for the input data.

Learning processor 1130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 1130 may perform AI processing along with a learning processor 1240 of AI server 1200.

At this time, learning processor 1130 may include a memory integrated or embodied in AI device 1100. Alternatively, learning processor 1130 may be realized using memory 1170, an external memory directly coupled to AI device 1100, or a memory held in an external device.

Sensing unit 1140 may acquire at least one of internal information of AI device 1100, environmental information around AI device 1100, and user information using various sensors.

At this time, the sensors included in sensing unit 1140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

Output unit 1150 may generate, for example, a visual output, an auditory output, or a tactile output.

At this time, output unit 1150 may include, for example, a display that outputs visual information, a speaker that outputs auditory information, and a haptic module that outputs tactile information.

Memory 1170 may store data which assists various functions of AI device 1100. For example, memory 1170 may store input data acquired by input unit 1120, learning data, learning models, and learning history, for example.

Processor 1180 may determine at least one executable operation of AI device 1100 based on information determined or generated using a data analysis algorithm or a machine learning algorithm. Then, processor 1180 may control constituent elements of AI device 1100 to perform the determined operation.

To this end, processor 1180 may request, search, receive, or utilize data of learning processor 1130 or memory 1170, and may control the constituent elements of AI device 1100 so as to execute a predictable operation or an operation that is deemed desirable among the at least one executable operation.

At this time, when connection of an external device is required to perform the determined operation, processor 1180 may generate a control signal for controlling the external device and may transmit the generated control signal to the external device.

Processor 1180 may acquire intention information with respect to user input and may determine a user request based on the acquired intention information.

At this time, processor 1180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 1130, may have learned by learning processor 1240 of AI server 1200, or may have learned by distributed processing of these processors.

Processor 1180 may collect history information including, for example, the content of an operation of AI device 1100 or feedback of the user with respect to an operation, and may store the collected information in memory 1170 or learning processor 1130, or may transmit the collected information to an external device such as AI server 1200. The collected history information may be used to update a learning model.

Processor 1180 may control at least some of the constituent elements of AI device 1100 in order to drive an application program stored in memory 1170. Moreover, processor 1180 may combine and operate two or more of the constituent elements of AI device 1100 for the driving of the application program.

Figure 12:
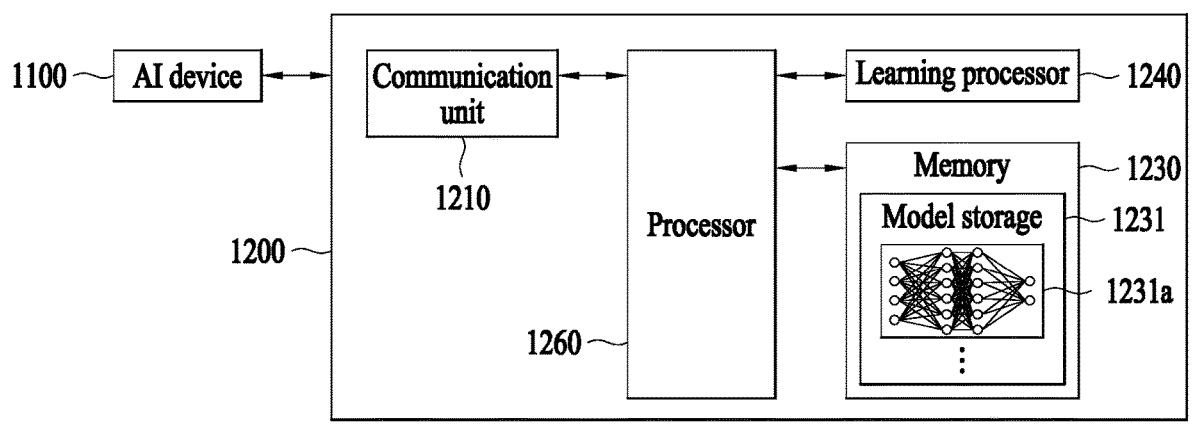
FIG. 12 shows an AI server according to an embodiment of the present invention.

FIG. 12 illustrates AI server 1200 according to an embodiment of the present disclosure.

Referring to FIG. 12, AI server 1200 may refer to a device that causes an artificial neural network to learn using a machine learning algorithm or uses the learned artificial neural network. Here, AI server 1200 may be constituted of multiple servers to perform distributed processing, and may be defined as a 5G network. At this time, AI server 1200 may be included as a constituent element of AI device 1100 so as to perform at least a part of AI processing together with the AI device.

AI server 1200 may include a communication unit 1210, a memory 1230, learning processor 1240, and a processor 260, for example.

Communication unit 1210 may transmit and receive data to and from an external device such as AI device 1100.

Memory 1230 may include a model storage unit 1231. Model storage unit 1231 may store a model (or an artificial neural network) 1231*a* which is learning or has learned via learning processor 1240.

Learning processor 1240 may cause artificial neural network 1231*a* to learn learning data. A learning model may be used in the state of being mounted in AI server 1200 of the artificial neural network, or may be used in the state of being mounted in an external device such as AI device 1100.

The learning model may be realized in hardware, software, or a combination of hardware and software. In the case in which a part or the entirety of the learning model is realized in software, one or more instructions constituting the learning model may be stored in memory 1230.

Processor 1260 may deduce a result value for newly input data using the learning model, and may generate a response or a control instruction based on the deduced result value.

Figure 13:
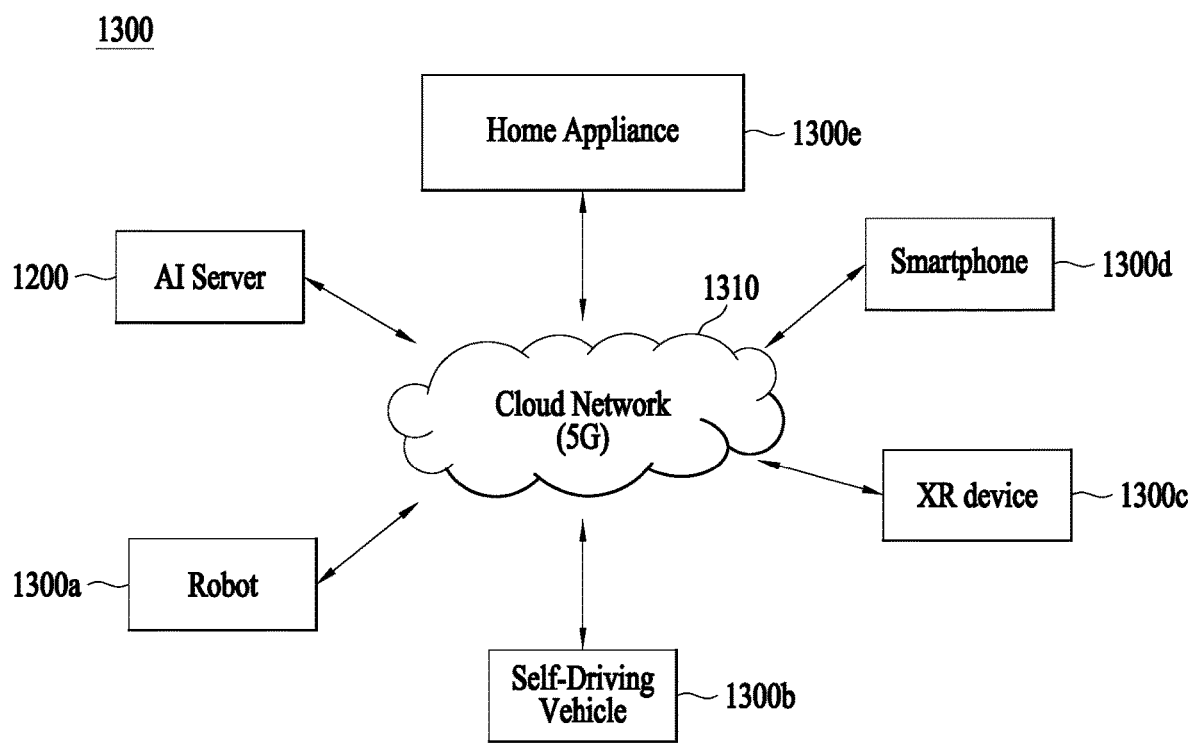
FIG. 13 shows an AI system according to an embodiment of the present invention.

FIG. 13 illustrates an AI system 1300 according to an embodiment of the present disclosure.

Referring to FIG. 13, in AI system 1300, at least one of AI server 1200, a robot 1300*a*, an autonomous vehicle 1300*b*, an XR device 1300*c*, a smart phone 1300*d*, and a home appliance 1300*e* is connected to a cloud network 1310. Here, robot 1300*a*, autonomous vehicle 1300*b*, XR device 1300*c*, smart phone 1300*d*, and home appliance 1300*e*, to which AI technologies are applied, may be referred to as AI devices 1300*a* to 1300*e*.

Cloud network 1310 may constitute a part of a cloud computing infra-structure, or may refer to a network present in the cloud computing infra-structure. Here, cloud network 1310 may be configured using a 3G network, a 4G or long term evolution (LTE) network, or a 5G network, for example.

That is, respective devices 1300*a* to 1300*e* and 1200 constituting AI system 1300 may be connected to each other via cloud network 1310. In particular, respective devices 1300*a* to 1300*e* and 1200 may communicate with each other via a base station, or may perform direct communication without the base station.

AI server 1200 may include a server which performs AI processing and a server which performs an operation with respect to big data.

AI server 1200 may be connected to at least one of robot 1300*a*, autonomous vehicle 1300*b*, XR device 1300*c*, smart phone 1300*d*, and home appliance 1300*e*, which are AI devices constituting AI system 1300, via cloud network 1310, and may assist at least a part of AI processing of connected AI devices 1300*a* to 1300*e*.

At this time, instead of AI devices 1300*a* to 1300*e*, AI server 1200 may cause an artificial neural network to learn according to a machine learning algorithm, and may directly store a learning model or may transmit the learning model to AI devices 1300*a* to 1300*e*.

At this time, AI server 1200 may receive input data from AI devices 1300*a* to 1300*e*, may deduce a result value for the received input data using the learning model, and may generate a response or a control instruction based on the deduced result value to transmit the response or the control instruction to AI devices 1300*a* to 1300*e*.

Alternatively, AI devices 1300*a* to 1300*e* may directly deduce a result value with respect to input data using the learning model, and may generate a response or a control instruction based on the deduced result value.

Hereinafter, various embodiments of AI devices 1300*a* to 1300*e*, to which the above-described technology is applied, will be described. Here, AI devices 1300*a* to 1300*e* illustrated in FIG. 13 may be specific embodiments of AI device 1100 illustrated in FIG. 11.

Robot 1300*a* may be realized into a guide robot, a transportation robot, a cleaning robot, a wearable robot, an entertainment robot, a pet robot, or an unmanned flying robot, for example, through the application of AI technologies.

Robot 1300*a* may include a robot control module for controlling an operation, and the robot control module may refer to a software module or a chip realized in hardware.

Robot 1300*a* may acquire information on the state of robot 1300*a* using sensor information acquired from various types of sensors, may detect (recognize) the surrounding environment and an object, may generate map data, may determine a movement route and a driving plan, may determine a response with respect to user intersection, or may determine an operation.

Here, robot 1300*a* may use sensor information acquired from at least one sensor among a lidar, a radar, and a camera in order to determine a movement route and a driving plan.

Robot 1300*a* may perform the above-described operations using a learning model configured with at least one artificial neural network. For example, robot 1300*a* may recognize the surrounding environment and the object using the learning model, and may determine an operation using the recognized surrounding environment information or object information. Here, the learning model may be directly learned in robot 1300*a*, or may be learned in an external device such as AI server 1200.

At this time, robot 1300*a* may directly generate a result using the learning model to perform an operation, but may transmit sensor information to an external device such as AI server 1200 and receive a result generated by the external device to perform an operation.

Robot 1300*a* may determine a movement route and a driving plan using at least one of map data, object information detected from sensor information, and object information acquired from an external device, and a drive unit may be controlled to drive robot 1300*a* according to the determined movement route and driving plan.

The map data may include object identification information for various objects arranged in a space along which robot 1300*a* moves. For example, the map data may include object identification information for stationary objects, such as the wall and the door, and movable objects such as a flowerpot and a desk. Then, the object identification information may include names, types, distances, and locations, for example.

In addition, robot 1300*a* may perform an operation or may drive by controlling the drive unit based on user control or interaction. At this time, robot 1300*a* may acquire interactional intention information depending on a user operation or voice expression, and may determine a response based on the acquired intention information to perform an operation.

Autonomous vehicle 1300*b* may be realized into a mobile robot, a vehicle, or an unmanned air vehicle, for example, through the application of AI technologies.

Autonomous vehicle 1300*b* may include an autonomous driving control module for controlling an autonomous driving function, and the autonomous driving control module may mean a software module or a chip realized in hardware. The autonomous driving control module may be a constituent element included in autonomous vehicle 1300*b*, but may be a separate hardware element outside autonomous vehicle 1300*b* so as to be connected thereto.

Autonomous vehicle 1300*b* may acquire information on the state of autonomous vehicle 1300*b* using sensor information acquired from various types of sensors, may detect (recognize) the surrounding environment and an object, may generate map data, may determine a movement route and a driving plan, or may determine an operation.

Here, autonomous vehicle 1300*b* may use sensor information acquired from at least one sensor among a lidar, a radar, and a camera in the same manner as robot 1300*a* in order to determine a movement route and a driving plan.

In particular, autonomous vehicle 1300*b* may recognize the environment or an object with respect to an area outside the field of vision or an area located at a predetermined distance or more by receiving sensor information from external devices, or may directly receive recognized information from external devices.

Autonomous vehicle 1300*b* may perform the above-described operations using a learning model configured with at least one artificial neural network. For example, autonomous vehicle 1300*b* may recognize the surrounding environment and the object using the learning model, and may determine a driving line using the recognized surrounding environment information or object information. Here, the learning model may be directly learned in autonomous vehicle 1300*b*, or may be learned in an external device such as AI server 1200.

At this time, autonomous vehicle 1300*b* may generate a result using the learning model to perform an operation, but may transmit sensor information to an external device such as AI server 1200 and receive a result generated by the external device to perform an operation.

Autonomous vehicle 1300*b* may determine a movement route and a driving plan using at least one of map data, object information detected from sensor information, and object information acquired from an external device, and a drive unit may be controlled to drive autonomous vehicle 1300*b* according to the determined movement route and driving plan.

The map data may include object identification information for various objects arranged in a space (e.g., a road) along which autonomous vehicle 1300*b* drives. For example, the map data may include object identification information for stationary objects, such as streetlights, rocks, and buildings, and movable objects such as vehicles and pedestrians. Then, the object identification information may include names, types, distances, and locations, for example.

In addition, autonomous vehicle 1300*b* may perform an operation or may drive by controlling the drive unit based on user control or interaction. At this time, autonomous vehicle 1300*b* may acquire interactional intention information depending on a user operation or voice expression, and may determine a response based on the acquired intention information to perform an operation.

XR device 1300*c* may be realized into a head-mount display (HMD), a head-up display (HUD) provided in a vehicle, a television, a cellular phone, a smart phone, a computer, a wearable device, a home appliance, a digital signage, a vehicle, a stationary robot, or a mobile robot, for example, through the application of AI technologies.

XR device 1300*c* may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1300*c* may output an XR object including additional information about a recognized object so as to correspond to the recognized object.

XR device 1300*c* may perform the above-described operations using a learning model configured with at least one artificial neural network. For example, XR device 1300*c* may recognize a real object from three-dimensional point cloud data or image data using a learning model, and may provide information corresponding to the recognized real object. Here, the learning model may be directly learned in XR device 1300*c*, or may be learned in an external device such as AI server 1200.

At this time, XR device 1300*c* may directly generate a result using the learning model to perform an operation, but may transmit sensor information to an external device such as AI server 1200 and receive the generated result to perform an operation.

Robot 1300*a* may be realized into a guide robot, a transportation robot, a cleaning robot, a wearable robot, an entertainment robot, a pet robot, or an unmanned flying robot, for example, through the application of AI technologies and autonomous driving technologies.

Robot 1300*a* to which the AI technologies and the autonomous driving technologies are applied may refer to, for example, a robot having an autonomous driving function, or may refer to robot 1300*a* which interacts with autonomous vehicle 1300*b*.

Robot 1300*a* having an autonomous driving function may collectively refer to devices that move by themselves along a given moving line without user control, or move by determining a moving line by themselves.

Robot 1300*a* and autonomous vehicle 1300*b*, which have an autonomous driving function, may use a common sensing method in order to determine at least one of a movement route or a driving plan. For example, robot 1300*a* and autonomous vehicle 1300*b*, which have an autonomous driving function, may determine at least one of the movement route or the driving plan using information sensed by a lidar, a radar, and a camera.

Robot 1300*a*, which interacts with autonomous vehicle 1300*b*, may be provided separately from autonomous vehicle 1300*b* so as to be connected to the autonomous driving function of autonomous vehicle 1300*b* inside or outside autonomous vehicle 1300b, or may perform an operation associated with a user who has got on autonomous vehicle 1300b.

At this time, robot 1300a, which interacts with autonomous vehicle 1300b, may acquire sensor information instead of autonomous vehicle 1300b to provide the information to autonomous vehicle 1300b, or may acquire sensor information and generate surrounding environment information or object information to provide the information to autonomous vehicle 1300b, thereby controlling or assisting the autonomous driving function of autonomous vehicle 1300b.

Alternatively, robot 1300a, which interacts with autonomous vehicle 1300b, may monitor the user who has got on autonomous vehicle 1300b or may control the functions of autonomous vehicle 1300b via interaction with the user. For example, when it is determined that a driver is in a drowsy state, robot 1300a may activate the autonomous driving function of autonomous vehicle 1300b or may assist the control of a drive unit of autonomous vehicle 1300b. Here, the functions of autonomous vehicle 1300b controlled by robot 1300a may include not only the autonomous driving function, but also a function provided in a navigation system or an audio system provided in autonomous vehicle 1300b.

Alternatively, robot 1300a, which interacts with autonomous vehicle 1300b, may provide information to autonomous vehicle 1300b or assist the function thereof at the outside of autonomous vehicle 1300b. For example, robot 1300a may serve as a smart traffic light that provides traffic information including, for example, traffic signal information to autonomous vehicle 1300b, or may serve as an automatic electric charger of an electric vehicle that may interact with autonomous vehicle 1300b and may be automatically connected to a charge port of the vehicle.

Robot 1300a may be realized into a guide robot, a transportation robot, a cleaning robot, a wearable robot, an entertainment robot, a pet robot, an unmanned flying robot, or a drone, for example, through the application of AI technologies and XR technologies.

Robot 1300a, to which the XR technologies are applied, may refer to a robot which is a control or interaction target in an XR image. In this case, robot 1300a may be provided separately from XR device 1300c and may operate in cooperation with XR device 1300c.

When robot 1300a, which is a control or interaction target in an XR image, acquires sensor information from sensors including a camera, robot 1300a or XR device 1300c may generate an XR image based on the sensor information, and XR device 1300c may output the generated XR image. Then, such robot 1300a may operate based on a control signal input through XR device 1300c or via intersection with the user.

For example, the user may check the XR image corresponding to the viewpoint of robot 1300a, which is remotely linked, via an external device such as XR device 1300c, and may adjust an autonomous driving route of robot 1300a or control an operation or driving thereof via interaction with the robot, or may check information on an object around thereof.

Autonomous vehicle 1300b may be realized into a mobile robot, a vehicle, or an unmanned air vehicle, for example, through the application of the AI technologies and the XR technologies.

Autonomous vehicle 1300b, to which the XR technologies are applied, may refer to an autonomous vehicle having an XR image providing device, or may refer to an autonomous vehicle as a control or interaction target in an XR image, for example. Particularly, autonomous vehicle 1300b as a control or interaction target in an XR image may be provided separately from XR device 1300c and may operate in cooperation with XR device 1300c.

Autonomous vehicle 1300b having the XR image providing device may acquire sensor information from sensors including a camera, and may output an XR image generated based on the acquired sensor information. For example, autonomous vehicle 1300b may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in autonomous vehicle 1300b, at least a portion of the XR object may be output so as to overlap with an object in the screen. For example, autonomous vehicle 1300b may output XR objects corresponding to objects such as a lane, another vehicle, a traffic light, a traffic sign, a two-wheeled vehicle, a pedestrian, and a building.

When autonomous vehicle 1300b as a control or interaction target in an XR image acquires sensor information from sensors including a camera, autonomous vehicle 1300b or XR device 1300c may generate an XR image based on the sensor information, and XR device 1300c may output the generated XR image. Then, autonomous vehicle 1300b may operate based on a control signal input through an external device such as XR device 1300c or via interaction with the user.

The above-described method according to the present disclosure may be provided as a program to be executed in a computer and be recorded on a computer readable recording medium.

The method of the present invention can be executed through software. When executed through software, the constituent means of the present invention are code segments that perform necessary tasks. The program or code segments may be stored in a processor readable medium.

A computer-readable recording medium is any data storage device that can store data which can be thereafter read by a computer system. Examples of the computer-readable recording medium, in non-transitory form, include a ROM (read only memory), a RAM (random access memory), a CD-ROM (compact disc), a magnetic tape, a floppy disk, an optical data storage, and so on. Further, the computer-readable recording medium can also be distributed over computer systems connected through a network so that the computer-readable code is stored and executed in a distributed fashion.

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention. However, the embodiment described herein may not be limitedly applied, and various modifications to the embodiments may be made by selectively combining all or some of the embodiments.

What is claimed is:

1. A mobile robot having a receiving unit and capable of moving, the mobile robot comprising:
at least three wheels arranged at a lower portion of the mobile robot;
a sensor configured to measure a weight of the mobile robot applied to each of the at least three wheels;

a linear actuator connected to the receiving unit and configured to apply a linear motion to the receiving unit in a direction toward a front section or a rear section of the mobile robot; and a processor configured to, based on the weight applied to each of the at least three wheels measured by the sensor, control the linear actuator so as to apply the linear motion to the receiving unit, wherein the processor is further configured to control the linear actuator when a difference between weights applied to the at least three wheels falls within a predetermined range and lasts for a period exceeding a predetermined threshold time.

2. The mobile robot of claim 1, wherein the processor is further configured to:

determine whether a center of mass of the mobile robot is biased toward the front section or the rear section, and control the linear actuator so as to apply the linear motion to the receiving unit in a direction opposite to a direction toward the center of mass of the mobile robot is biased.

3. The mobile robot of claim 1, further comprising a linear guide device configured to guide the linear motion.

4. The mobile robot of claim 3, wherein the linear guide device is arranged between an outer wall of the mobile robot and the receiving unit.

5. The mobile robot of claim 3, wherein the linear guide device includes a predetermined block to allow the receiving unit to move on the linear guide device, and wherein the linear guide device and the receiving unit are connected through the predetermined block.

6. The mobile robot of claim 1, wherein the processor is further configured to control the linear actuator so that uniform weights are applied to the at least three wheels.

7. The mobile robot of claim 1, wherein the processor is further configured to control the linear actuator so as to apply the linear motion to the receiving unit in a moving direction of the mobile robot when the mobile robot moves to a sloped ground which is biased upward.

8. The mobile robot of claim 1, wherein the processor is further configured to control the linear actuator so as to apply the linear motion to the receiving unit in an opposite direction of a moving direction of the mobile robot when the mobile robot moves to a sloped ground which is biased downward.

9. The mobile robot of claim 1, wherein the mobile robot further comprises an output unit, and wherein the processor is configured to control the output unit to output an alarm signal based on whether a center of mass of the mobile robot is biased and is positioned within a predetermined distance from a stable region.

10. The mobile robot of claim 1, further comprising a plurality of linear guide devices configured to guide the linear motion.

11. A method for controlling a center of mass of a mobile robot, the method comprising:

measuring weights of the mobile robot applied to at least three wheels arranged at a lower portion of the mobile robot; and based on a weight applied to each of the at least three wheels, controlling a linear actuator so as to apply a linear motion to a receiving unit included in the mobile robot in a direction toward a front section or a rear section of the mobile robot, wherein the controlling of the linear actuator comprises controlling the linear actuator when a difference between the weights applied to the at least three wheels falls within a predetermined range and lasts for a period exceeding a predetermined threshold time.

12. The method of claim 11, wherein the controlling of the linear actuator further comprises:

determining whether the center of mass of the mobile robot is biased toward the front section or the rear section; and controlling the linear actuator so as to apply the linear motion to the receiving unit in a direction opposite to a direction toward which the center of mass is biased.

13. The method of claim 12, wherein the controlling of the linear actuator further comprises controlling the linear actuator so as to apply the linear motion to the receiving unit in the direction, which is opposite to the direction toward which the center of mass of the mobile robot is biased, along a linear guide device that guides the linear motion.

14. The method of claim 11, wherein the controlling of the linear actuator further comprises controlling the linear actuator so that uniform weights are applied to the at least three wheels.

15. The method of claim 11, wherein the controlling of the linear actuator further comprises controlling the linear actuator so as to apply the linear motion to the receiving unit in a moving direction of the mobile robot when the mobile robot moves to a sloped ground which is biased upward.

16. The method of claim 11, wherein the controlling of the linear actuator further comprises controlling the linear actuator so as to apply the linear motion to the receiving unit in an opposite direction of a moving direction of the mobile robot when the mobile robot moves to a sloped ground which is biased downward.

17. The method of claim 11, wherein the method further comprises outputting an alarm signal based on whether the center of mass of the mobile robot is biased and is positioned within a predetermined distance from a stable region.

18. A method for controlling a center of mass of a mobile robot, the method comprising:

measuring weights of the mobile robot applied to at least three wheels arranged at a lower portion of the mobile robot; and based on a weight applied to each of the at least three wheels, controlling a linear actuator so as to apply a linear motion to a receiving unit included in the mobile robot in a direction toward a front section or a rear section of the mobile robot, wherein the method further comprises outputting an alarm signal based on whether the center of mass of the mobile robot is biased and is positioned within a predetermined distance from a stable region.

* * * * *